Patented Nov. 12, 1940

2,220,981

UNITED STATES PATENT OFFICE 2,220,981

FUNGICIDE

William P. ter Horst, Packanack Lake, N. J., assignor, by mesne assignments, to United States Rubber Company, New York, N. Y., a corporation of New Jersey No Drawing. Application October 14, 1938, Serial No. 234,961

3 Claims. (Cl. 167—30)

This invention relates to improvements in fungicides.

More particularly the invention relates to a fungicidal preparation containing as an active constituent a hydroxy diarylamine in which the hydrogen of the hydroxy group has been replaced by an acidyl group.

A preferred compound is the borate derivative of para-hydroxy-diphenylamine, in which latter the hydrogen of the hydroxy group has been replaced by a boric acid residue. The boric acid compound is believed to have the formula:

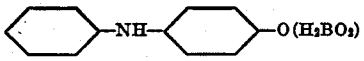

and may be termed p-anilino-phenyl borate. When 5 grams of the boric acid compound was suspended in 1,000 grams of water containing a small amount of a wetting agent (sulphite lye) and the suspension sprayed upon glass slides on which *Macrosporium sarcinaeforme* were subsequently placed, practically complete prevention of spore germination resulted.

Instead of the boric acid compounds, the anilinophenyl esters of other acids may be used, such as those of salicylic acid, benzoic acid, phosphoric acid, etc.

The materials described herein may be applied undiluted, or suspended in water or other vehicle, or mixed with clay, talc, and the like, and may be used in admixture with parasiticides in general.

Having thus described my invention, what I claim and desire to protect by Letters Patent is:

1. A fungicide preparation containing as an active constituent a mono-hydroxy-diphenyl-amine in which the hydroxyl hydrogen atom is replaced by an acidyl group.

2. A fungicide preparation containing as an active constituent a mono-hydroxy-diphenyl-amine in which the hydroxyl hydrogen atom is replaced by a boric acid residue.

3. A fungicide preparation containing as an active constituent p-anilino-phenyl borate.

WILLIAM P. TER HORST.